J. H. GALLOUPE.
APPARATUS FOR THE TREATMENT OF OIL BEARING SHALE, BITUMENS, HYDROCARBONS, AND OTHER ELEMENTS OF A VOLATILE NATURE.
APPLICATION FILED NOV. 19, 1917.
1,283,723.
Patented Nov. 5, 1918.
2 SHEETS—SHEET 2.
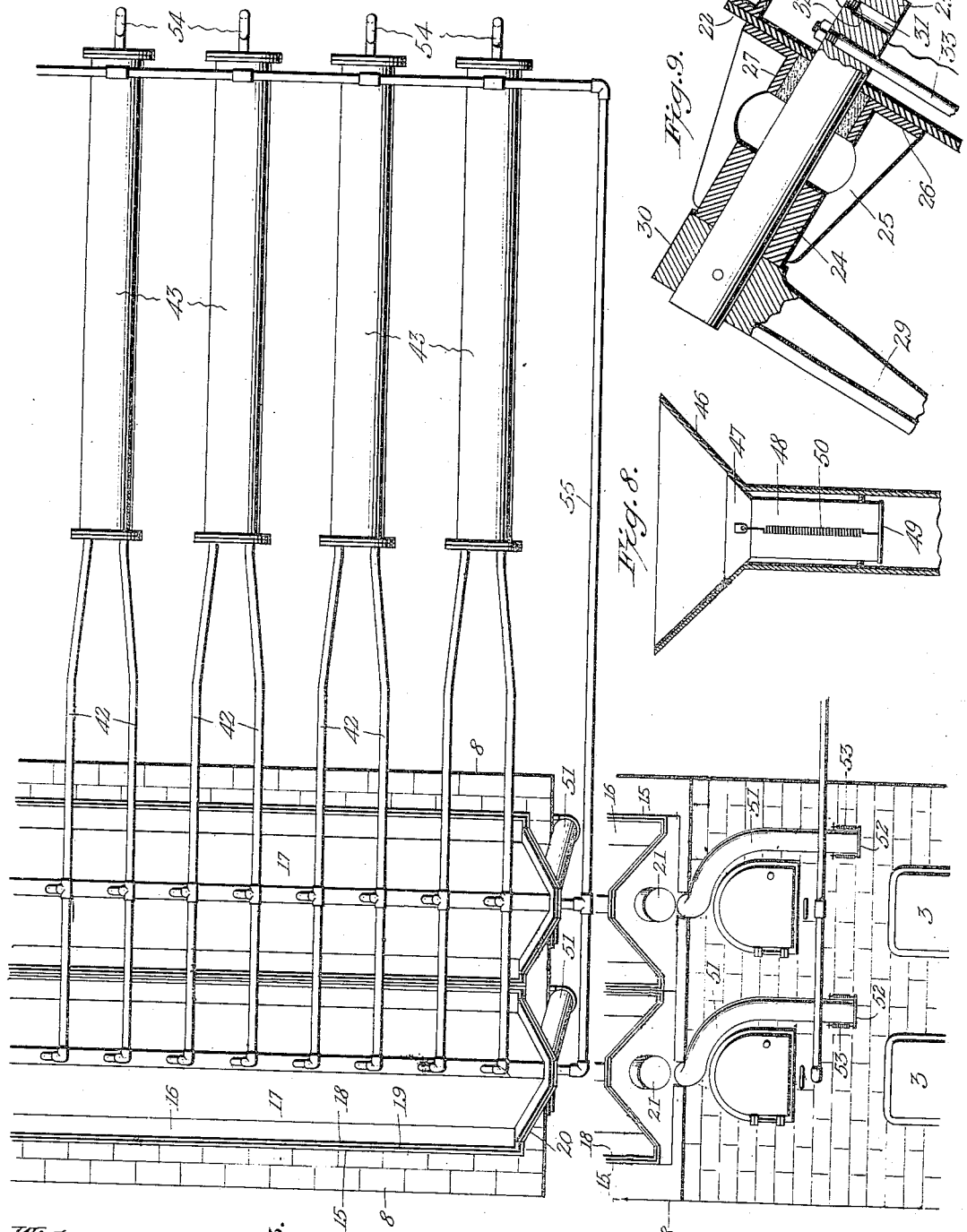

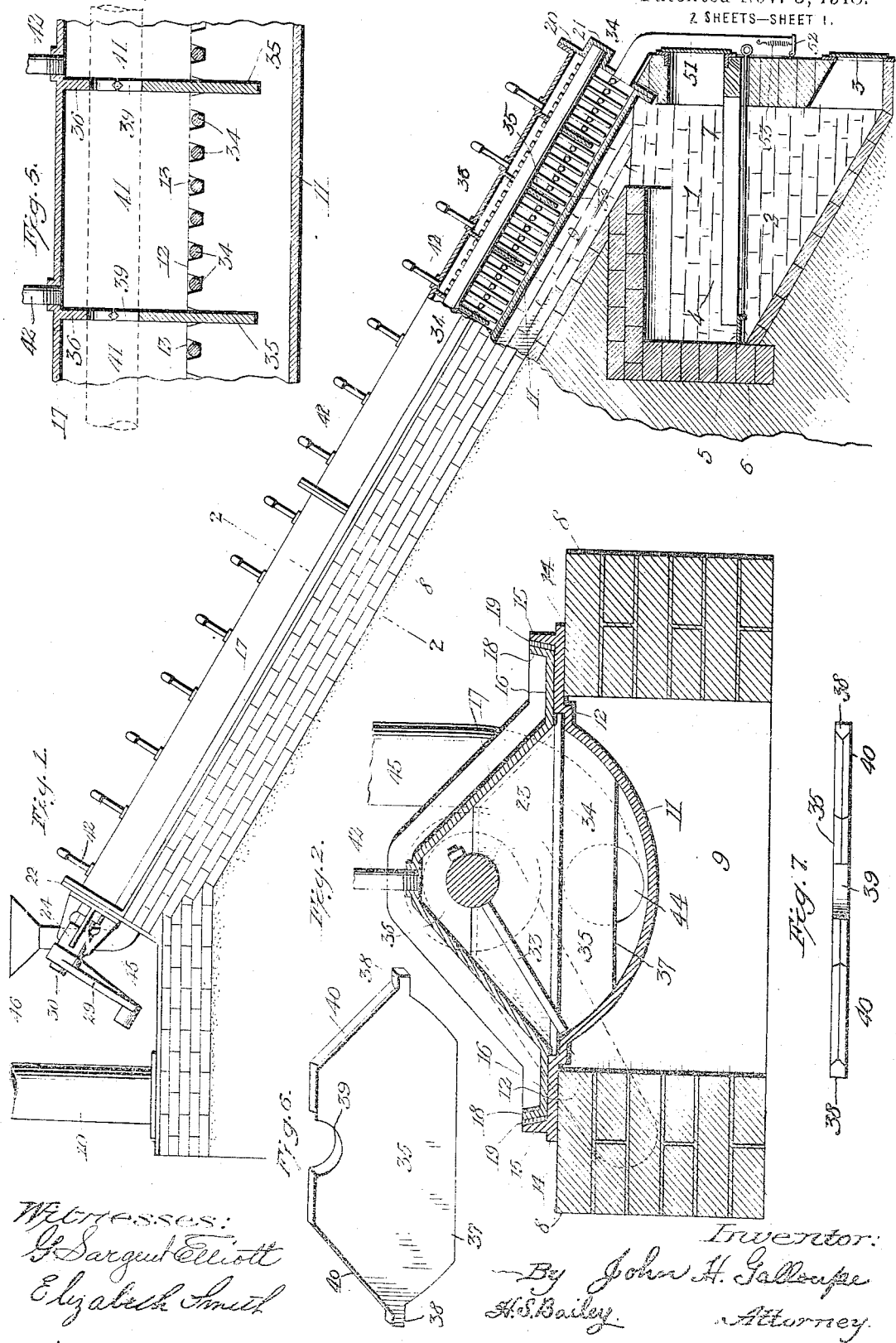

UNITED STATES PATENT OFFICE.

JOHN H. GALLOUPE, OF DENVER, COLORADO.

APPARATUS FOR THE TREATMENT OF OIL-BEARING SHALE, BITUMENS, HYDRO-CARBONS, AND OTHER ELEMENTS OF A VOLATILE NATURE.

1,283,723.   Specification of Letters Patent.   Patented Nov. 5, 1918.

Application filed November 19, 1917.   Serial No. 202,848.

*To all whom it may concern:*

Be it known that I, JOHN H. GALLOUPE, a citizen of the United States of America, residing at the city and county of Denver and State of Colorado, have invented a new and useful Apparatus for the Treatment of Oil-Bearing Shale, Bitumens, Hydrocarbons, and other Elements of a Volatile Nature, of which the following is a specification.

This invention relates to improvements in apparatus for the treatment of oil bearing shale, bitumens, hydrocarbons and other elements of a volatile nature, for the liberation and fractionation of the gases contained therein.

The object of the invention is to provide an apparatus in the nature of a retort, which is adapted to forward in a gradual and successive manner, materials fed thereto, from a zone of low thermal activity, to a zone of maximum heat, by the combined action of gravity, and of agitating elements.

To provide an apparatus for the treatment of oil bearing shale and other elements, whereby the hydro-carbon constituents therein, ranging from the lightest to the heaviest, are successively separated and collected.

To provide an apparatus of this character comprising a retort partitioned into separated cells or compartments, whereby the mixing of lighter elemental gases with the heavier gases of higher thermal units is prevented, with the consequent thermal decomposition of the gases, means being provided for separately condensing or distilling the various gases, and for varying their fractionation by interchangeably grouping the various outlet pipes connecting the retort and the condensing elements.

To provide an inclined retort adapted to effect successive volatilization of a constantly varying degree throughout the length of the apparatus, the said retort being partitioned into cells which communicate along the bottom thereof, and being provided with oscillating agitators, a furnace being arranged at the lower end of the retort, and the said cells being separately connected with condensers, means being provided for conveying the uncondensed gases to the combustion chamber of the furnace.

These objects are accomplished by the apparatus illustrated in the accompanying drawings, in which:

Figure 1 is a side view partly in section, of the improved apparatus.

Fig. 2 is a vertical transverse sectional view thereof on the line 2—2 of Fig. 1.

Fig. 3 is a plan view showing two retorts arranged side by side, and the condensers which receive and condense the gases from the retorts.

Fig. 4 is a front view of the retorts shown in Fig. 3.

Fig. 5 is a longitudinal sectional view of a portion of a retort, showing two of the partitions, and also the scrapers and manner of supporting the same, the agitators and their supporting shaft being removed.

Fig. 6 is a perspective view of one of the partition members.

Fig. 7 is a top edge view of the same.

Fig. 8 is a sectional view of the feed hopper; and

Fig. 9 is a longitudinal sectional view through a portion of the upper end of the retort.

In the practical operation of my invention, I may employ one or two or more of the retorts, as may be required, arranging them side by side and connecting them by gas outlet pipes, to condensers, as shown in Fig. 3, the retorts inclining downwardly at a suitable angle from their feed ends to their discharge ends, beneath which the furnaces are connected.

Referring to the accompanying drawings:

The numeral 1 indicates the combustion chamber of one of the furnaces; and 2, the ash pit, the bottom of which inclines downwardly to the door 3, to facilitate the discharge of the ashes. The grate bars, 4, preferably terminate a short distance from the back end of the combustion chamber, and the intervening space is closed by a slide plate 5, which is supported in a slideway 6, the plate having an operating rod 7, which extends out through the front wall of the furnace; the withdrawal of the plate 5 permitting the discharge of the ashes into the ash pit, as will be understood.

From the furnace parallel walls, 8, extend upward at an angle of approximately thirty degrees from a horizontal plane, and these walls inclose a flue 9, which extends the entire length of the apparatus and terminates in a short horizontal extension, which opens into a stack 10.

Above the flue 9, and resting upon the walls 8, is the base or bed portion 11 of the retort, which may be of any required length and is arranged as follows:

The base or bed of the retort is substantially semi-circular in cross section and this semi-circular portion terminates at opposite points in steps 12, each of which runs the whole length of the bed, and in each step, throughout its length, is formed a series of spaced transverse notches or recesses 13, the recesses in one step being diametrically opposite those in the opposite step. Extending laterally from the step portions, are horizontally disposed flange portions 14, which rest upon the walls 8, as clearly shown in Fig. 2, and thus support the bed above the flue 9. Along the edge of each flange 14 is formed a vertical rib 15, which extends the whole length of the flange, and between these ribs, and resting on the flanges 14, are flange portions 16, of the cover or hood 17 of the retort.

The flanges 16 of the hood terminate along their edges in ribs 18, which, when the hood is in position upon the bed, are spaced far enough from the ribs 15 of the bed, to permit the insertion of a suitable packing 19, which seals any outlet between the bed and hood and thus prevents the escape of gases.

The retort is closed at its lower end by a plate 20, having a bearing socket 21, and at its upper end by a plate 22, having a circular aperture in axial line with the socket 21.

A shaft 23 extends longitudinally through the hood, one end thereof being supported in the bearing 21, while its opposite end extends through and beyond the aperture in the end plate 22, and is supported in a bearing 24, which is connected by arms 25, with a plate 26, which is bolted to the end plate 22.

The plate 26 is formed with a suitable packing box 27, which surrounds the shaft, as shown in Fig. 9, and this box receives a suitable heat-resisting packing 28, such as asbestos, which prevents the escape of gases through the aperture in the end plate 22, surrounding the shaft.

A rock arm 29 is rigidly secured upon the outer end of the shaft 23, and the hub portion 30 of this arm abuts against the bearing 24, and together with the bearing 21 prevents sliding movement of the shaft.

The shaft is provided throughout that portion of its length between the end plates 20 and 22, with spaced holes 31, which intersect the axis of the shaft and these holes are the same distance apart as are the notches or recesses 13, in the steps 12 of the bed; but these holes are so arranged that they alternate with the said recesses 13, for a purpose which will hereinafter appear.

The holes 31 are unthreaded for approximately three-fourths of their length, and the remaining portions are threaded, as shown, a slight shoulder 32, occurring at the intersection of the threaded and unthreaded portions. In each of the holes 31 is placed the threaded and shouldered end of a rod 33, which extends to within a slight distance of the bed, and these rods constitute agitators, as will hereinafter appear.

In the oppositely positioned pairs of recesses 13, of the steps 12, are placed transverse scraper bars 34, which extend between the agitators 33, and these bars are held in their supporting recesses 13, by the inner edges of the flange portions 16 of the hood, which overlap the ends of the scrapers, as shown in Fig. 2. The function of these bars is to remove the sticky or plastic shale from the agitating rods 33, as the said rods swing back and forth through the shale and above the bed. But for the bars 34, such quantities of the shale would accumulate on the rods 33, as to prevent them from agitating the shale, and assisting it in its progress down the bed 11. At regular intervals, throughout the length of the retort, one of the scraper bars 34, is omitted, and in its place the lower member 35 of a transverse partition is placed, the upper member 36 thereof being an integral part of the hood.

The lower member 35 of each partition, is of the shape and construction shown in Fig. 6, and comprises a portion which fits within the bed, and terminates in a straight, horizontal bottom edge 37, which leaves a space between the said edge and the curved face of the bed, the side edges being curved to correspond to the curvature of the bed. These curved side edges terminate in lateral projections 38, which rest in the recesses 13 of the steps 12, and the edges extending upward from the projections 38, are inclined, to correspond to the inclined sides of the hood, and the top edge is on a horizontal plane coincident with the axis of the shaft 23. The top edge of this plate is provided with a semi-circular recess 39, and the other member 36, of the partition is provided with a corresponding semi-circular recess, and these recesses form a circular hole to receive the shaft 23.

The inclined edges of the partitions 35 are channeled, as shown at 40, and are adapted to be packed with suitable material to prevent the passage of gas between these edges and the sides of the hood. The meeting edges of the two members of the partitions are also channeled as shown, to receive suitable packing for preventing the passage of gas.

It will thus be seen, that the partitions separate the retort into a plurality of independent cells or compartments 41, which are in communication at their lower ends but are non-communicating at their upper ends, and from the upper end of each cell extends a gas outlet pipe 42, which communicates with a condenser 43. In Fig. 3, I have shown the outlet pipes of each two cells leading to a common condenser, but the invention contemplates any desired grouping of the pipes to accomplish the desired fractionation of the condensed gases.

The upper end plate 22, of the retort, is provided with a feed inlet hole 44, in which is secured the lower end of a feed pipe 45, which is curved, as shown in Fig. 2, to clear the end of the shaft 23, and its bearing; and the upper end of this feed pipe carries a hopper 46, for the reception of the material to be treated. Within the hopper 46 is supported a hopper section 47, having a depending throat 48, which extends down a suitable distance into the feed pipe 45, and its lower end is provided with a cover plate 49, which is normally held against the lower end of the throat by springs 50. When the weight of material in the hopper overcomes the contraction force of the springs, the plate uncovers the end of the throat 48 and permits material to pass out into the feed pipe 45, and thence into the retort. When there is not sufficient material in the hopper to overcome the force of the springs, they will automatically retract the plate to cover the end of the throat, and thus prevent the escape of gases from the retort. The lower end plate 20 of the retort, is provided with an opening in which is inserted an outlet pipe 51, having a spring controlled hinged door 52, at its lower end, which permits the discharge of residuum, whenever the weight of an accumulation of the same is sufficient to overcome contracting force of the springs 53.

Each condenser 43, is provided with a goose neck outlet pipe 54, for the condensed product, and the several condensers are connected with a gas pipe 55, which is connected at its other end with the retort or retorts as the case may be, so as to discharge uncondensed gases into the combustion chamber of the furnace, where they augment the fuel supply, and thus give a maximum of heating efficiency.

In operation, the furnace is supplied with fuel, preferably oil bearing shale, and a supply of oil bearing shale is fed to the hopper 46, the shale having first been ground to about a quarter of an inch mesh.

The rock arm 29 is oscillated in any desired manner, to impart a corresponding motion to the shaft 23, whereby the agitating rods 33 are given a back and forth sweep over the whole curved area of the bed of the retort.

The shale from the hopper 46 enters the retort through the inlet 44, and is carried down the inclined bed by the combined action of gravity and of the agitating rods 33, the partitions 35 terminating far enough above the lowest point of the bed to permit the free passage of the said shale along the bed. The heat generated in the combustion chamber passes up through the flue 9 and in direct contact with the under side of the bed, which is thus heated to the maximum temperature required, at its lowest point, the temperature gradually decreasing toward the feed end of the retort. Thus, as the shale is carried forward, it is subjected to a gradually and continuously increasing temperature, by which the various gases are formed, which produce the different hydro-carbons, ranging from the light naphtha, gasolene or ammonia, to the heavy oils and pitch. The mixing of the lighter gases with the heavier gases of higher thermal units, which would result in thermal decomposition of the gases, is prevented by segregating the gases of varying thermal units, by means of the partitions, which divide the retorts into a plurality of cells, which collect the gases formed under different temperatures and effectively prevent mingling of the same.

Thus there is secured successive volatilization of a constantly varying degree throughout the length of the retort, and the gases are removed from the retort through their own mechanical and thermal energy and pass through the pipes 42 to the condenser 43, whence the condensed product passes out through the goose necks 54.

The resultant gases from two or three or more of the cells, may produce when condensed the same or practically the same product, and it is therefore advisable to group the pipes leading from such cells and connect them with a common condenser.

The ground shale is of a somewhat dry nature when it enters the retort, but its condition becomes plastic as the shale travels through the retort, causing it naturally to adhere to the agitators, as they sweep back and forth through the said material, but with each sweep of the agitators the material clinging thereto is removed by the scraper rods 34, thus maintaining the efficiency of the agitators.

The apparatus above described provides for the absolute segregation of the various gases formed by varying temperatures, and their condensation into hydro-carbons ranging from the lightest to the heaviest and it also prevents an emulsified combination of oils and water by the fractional removal of the moisture content, at a very early stage of the process.

Having described my invention what I claim as new and desire to secure by Letters Patent is:

1. In an apparatus for the treatment of oil bearing shale and other materials, an inclined longitudinal retort, comprising a bed substantially semi-circular in cross section and a hood which rests upon the same, said retort being separated into a plurality or cells the walls of which terminate near the bottom of the bed to form a continuous passage beneath the cells, a feed hopper at the upper end of the retort, a discharge spout at the lower end thereof, a longitudinal shaft extending through said hood and means for oscillating the same, rods secured at their upper ends in said shaft and extending to within a slight distance of the bed, whereby material entering said retort is carried forward by the combined action of gravity and of said rods, means for applying heat to said retort, under a continuously decreasing temperature from its lowest to its highest end, condensers and gas pipes connecting the upper ends of the cells with said condensers, whereby gases formed by subjecting said material to varying degrees of temperature, are segregated by said cells and pass through said pipes to said condensers.

2. In an apparatus for the treatment of oil-bearing shale and other material, a retort comprising a longitudinal bed substantially semi-circular in cross-section, a hood which rests on said bed, partitions in said retort which extend from the top of the hood to within a short distance of the lowest point of the bed and divide said retort into a plurality of cells, a shaft extending through said hood and means for oscillating the same, agitating rods depending from said shaft, scrapers arranged between said rods, a feed hopper at one end of said retort, a discharge pipe at the opposite end thereof and pipes leading from the upper ends of said cells.

3. In an apparatus for the treatment of oil bearing shale and other materials, the combination with an inclined retort comprising a longitudinal bed substantially semi-circular in cross section, a hood which rests upon the same, and an oscillable shaft extending through said hood having spaced depending agitator rods secured therein, of partitions in said retort which divide the same into a plurality of cells, said partitions comprising removable sections which extend from near the bottom of the bed to points on a line with the axis of the shaft and matching sections which are formed integral with the hood, the partition sections being provided with matching semi-circular recesses for the reception of the shaft, a feed inlet at the upper end of the retort, a discharge spout at the lower end thereof, pipes leading from the upper ends of the cells, and means for applying heat to said retort under a continuously decreasing temperature from its lowest to its highest point.

4. In an apparatus for the treatment of oil bearing shale and other material, the combination with a longitudinal inclined retort, the bottom of which is substantially pipes in said hood between said partitions, semi-circular in cross section, said retort being divided into a plurality of cells the partition walls of which terminate near the bottom of the retort, of an oscillable shaft extending through the retort, depending agitator rods secured at their upper ends to said shaft, transverse scrapers extending between said agitators, an inlet spout at the upper end of said retort, an outlet spout at the lower end thereof, condensers, pipes leading from the upper ends of said cells and connected with said condensers, and means for applying heat to said retort under a continuously decreasing temperature from its lowest to its highest point.

5. In an apparatus of the character described, the combination with an inclined retort, comprising a longitudinal hood and a bed, the latter being substantially semi-circular in cross section and having diametrically opposite spaced notches, of partition members which occur at regular intervals the ends of which rest in pairs of said oppositely disposed notches, said members extending from near the bottom of the retort to near the top of the hood and partition sections formed in said hood which register with the first sections, and divide the retort into a plurality of cells, transverse scraper bars supported in the remainder of the notches, a shaft extending through said partitions and beyond the upper end of the retort, and a rock arm on the end of said shaft for imparting an oscillating motion thereto, depending agitating rods on said shaft which extend between said scraper bars, a feed spout at the upper end of the bed, a discharge spout at the lower end thereof, means for applying heat to said bed under a continuously decreasing temperature from its lower to its upper end, receivers, and outlet pipes at the upper ends of said cells connected with said receivers.

6. In an apparatus for the treatment of shale and other materials, the combination with an inclined retort comprising a hood and a bed member, of two part partitions in said retort comprising depending integral plates in said hood having semi-circular recesses in their lower edges, and removable plates which register with the hood plates and are provided with semi-circular recesses matching those in the hood plates and form circular openings, said removable plates extending nearly to the bottom of the bed, the meeting edges of said plates, and the edges of the removable plates engaging the hood walls, being channeled to receive packing, a feed spout at the upper end of the bed, an outlet spout at the lower end thereof, an oscillatory shaft extending through the holes in said partitions, spaced agitators connected to said shaft, outlet condensers with which said pipes are connected, and means for applying heat to said bed under a continuously decreasing temperature from its lower to its upper end.

7. In an apparatus of the character described, the combination with an inclined retort comprising a bed substantially semi-circular in cross section and a hood the sides of which incline toward each other from their lower edges, of partitions in said retort extending from the top of the hood to near the bottom of the bed, dividing the retort into cells and leaving a passageway on the bed beneath the said cells, a feed pipe at the upper end of the bed, a discharge pipe at the lower end thereof, oscillating stirrers pivotally supported in said cells, means for applying heat to said bed under a continuously decreasing temperature from its lower to its upper end, condensers, fractioning pipes in the contracted upper ends of the cells which connect with the condensers, gas pipes connecting the condensers and leading to the heating means, and transverse scrapers extending across the bed between the said stirrers.

8. In apparatus of the character described an inclined retort comprising a bed substantially semicircular in cross section, a hood removably secured to said bed, a longitudinal oscillatory shaft extending through the hood, the curvature of said bed being an arc whose center is the axis of said shaft, spaced agitator rods extending from said shaft to within a slight distance of the bed, transverse bars supported in notches in said bed, which lie between said agitator rods, pipes extending at intervals from the upper portion of said hood, a feed hopper at the upper end of the retort, a discharge spout at the lower end thereof, and means for applying heat beneath said bed.

In testimony whereof I affix my signature in presence of two witnesses.

JOHN H. GALLOUPE.

Witnesses:
   G. SARGENT ELLIOTT,
   ELIZABETH SMITH.